United States Patent [19]

Lowder

[11] 4,388,101
[45] Jun. 14, 1983

[54] NON-PRESSURE NITROGEN CARRIER FERTILIZER SOLUTIONS AND DISPERSIONS AND PROCESS OF MANUFACTURE

[75] Inventor: Robert L. Lowder, Heyburn, Id.

[73] Assignee: Occidental Chemical Agricultural Products, Inc., Los Angeles, Calif.

[21] Appl. No.: 20,399

[22] Filed: Mar. 14, 1979

[51] Int. Cl.$^3$ ............................ C05C 9/00; C05G 1/00
[52] U.S. Cl. ........................................... 71/29; 71/30; 71/33; 71/40
[58] Field of Search .................. 71/30, 28, 29, 64 C, 71/64 G, 40, 64.08, 64.1, 903, 904; 260/555 S; 564/63, 32, 3

[56] References Cited

U.S. PATENT DOCUMENTS

| | | | |
|---|---|---|---|
| T940,014 | 11/1975 | Nichols et al. | 71/30 X |
| 2,017,588 | 10/1935 | Ropp et al. | 71/29 X |
| 3,234,004 | 2/1966 | Smith et al. | 71/28 |
| 3,433,617 | 3/1969 | Legal et al. | 71/40 X |
| 3,525,602 | 8/1970 | Barker | 71/40 |
| 4,116,664 | 9/1978 | Jones | 260/555 S X |

Primary Examiner—Ferris H. Lander
Attorney, Agent, or Firm—Fulwider, Patton, Rieber, Lee & Utecht

[57] ABSTRACT

A "non-pressure" liquid fertilizer containing nitrogen and sulfur can be prepared by a process comprising (a) mixing sulfuric acid in water, (b) dissolving urea into the resulting solution, and (c) adding anhydrous ammonia in an amount sufficient to bring the pH of the solution to between about 6 and 8. The resulting liquid fertilizers can typically contain in the range of about 19 to about 25% nitrogen and in the range of about 3 to 6% sulfur and remain substantially free from crystals when stored at temperatures above about 40° F. A 19-0-0 liquid fertilizer containing about 3% S (as sulfate) remained crystal free when stored for about a month at about 32° F. The "non-pressure" liquid can be blended with dispersion-type fertilizers. Dispersion-type fertilizers of low phosphate content can be made by substituting phosphoric acid for some or all of the sulfuric acid.

19 Claims, No Drawings

NON-PRESSURE NITROGEN CARRIER FERTILIZER SOLUTIONS AND DISPERSIONS AND PROCESS OF MANUFACTURE

BACKGROUND OF THE INVENTION

This invention relates to improvements in the production of liquid fertilizers containing nitrogen and sulfur compounds.

The largest segment of nitrogen carriers used in liquid fertilizers are nitrogen solutions. They are used in direct applications to the soil and in the production of other fluid fertilizers. Lists of the many types of nitrogen solutions are given in (USDA Handbook 198: 1965 issue). Nitrogen solutions are designated as Non-Pressure, Low-Pressure and Medium-Pressure solutions.

Ammonium thiosulfate having a content of nutrients expressed, in the conventional manner, as 12-0-0-26S in aqueous solution can be used as a source of nitrogen and sulfur plant nutrients, however, it is expensive for use as a fertilizer. Another possible aqueous fertilizer solution is known commercially as ammonium polysulfide and is made by reacting anhydrous ammonia with elemental sulfur. In aqueous solutions, it can have an analysis as high as 20-0-0-45S. However, it also is an expensive fertilizer and is not compatible with many other nitrogen compounds and solutions or with phosphates (i.e., excessive crystallization and/or solid formation occurs when one attempts to dissolve phosphates or other nitrogen compounds into these solutions). Ammonium polysulfate solutions must also be stored under pressure because they lose ammonia vapors to the atmosphere.

Anhydrous ammonia and aqueous solutions of ammonia are relatively inexpensive and high in nitrogen content (anhydrous ammonia is 82% N). However, these ammonia fertilizers require storage under pressure. When anhydrous ammonia is injected directly into soil from a pressurized container (e.g. at 125 psi or above) it quickly becomes a gas at atmospheric pressure and combines very rapidly with moisture and clay to form ammonium ions, which are stable. However, if aqueous ammonia and anhydrous ammonia are not injected at least about 6″ below the soil, or are applied at the soil surface, the loss of nutrient is very rapid, due to volatilization of ammonia into the air.

When nitrogen solutions contain little or no free or uncombined ammonia, they have very low vapor pressure at normal temperatures, and are called non-pressure solutions. Chapter 17 of the "Liquid Fertilizer Manual" of the Natural Fertilizer Solutions Association, Peoria, Ill. lists many of the non-pressure nitrogen solutions. It can be seen from this list that most non-pressure solutions are made from ammonium nitrate or urea or their combinations. Urea-ammonium nitrate formulations are commonly referred to as UAN solutions.

A mixture of ammonium nitrate and urea in the proper proportions gives a non-pressure nitrogen solution, which contains 50 percent or more nitrogen than a saturated solution of either salt alone at the same temperature. The "320" solutions are a mixture of two nitrogen salts which varied between 44–45 percent ammonium nitrate, and 35–36 percent urea, or a similar ratio for the more dilute solutions. The nitrogen content of such a mixture varies from 28 to 32 percent nitrogen with salting out temperatures of 0° to 32° F. They may be used for direct application to soils and crops and in the manufacture of higher nitrogen grades of fluid fertilizer.

One highly useful non-pressurized liquid source of nitrogen is an aqueous solution of urea, ammonia nitrate and minor amounts of ammonia (primarily to adjust pH). The maximum practical nitrogen content in such a solution is about 32% N. One commercial solution is marketed under the trade name UN 32. Such liquid fertilizers can be made directly from carbon dioxide, anhydrous ammonia and nitric acid. Much heat is evolved in this process. More commonly, in a mixing plant such a solution is made by mixing ammonium nitrate (34-0-0) plus urea (46-0-0) plus hot water plus anhydrous ammonia. Another such solution is made by dissolving urea, nitric acid and ammonia. In this process, heat from neutralization of the nitric acid aids in dissolving the urea and evaporates some water, which increases the grade (i.e., makes a more concentrated solution).

It is believed that such solutions have not heretofore been formulated with sulfur compounds to provide a liquid fertilizer having both nitrogen and sulfur as nutrients.

It is frequently desirable to have both nitrogen and sulfur and trace elements, such as zinc, in a liquid fertilizer. It is also desirable, for controlled release of nutrients, to have the nitrogen in a fertilizer present in several forms, e.g., ammonia and urea.

It is also desirable in colder climates to have liquid fertilizers which do not form appreciable crystals (e.g., "salting out") when stored below about 40° F., or in the vicinity of about 32° F. Depending upon the concentration, solutions of ammonium nitrate or urea can have severe crystal formation when stored around about 32° F. For example, an ammonium nitrate solution containing about 20% N can have heavy crystal formation below about 41° F.

Additional data on compositions and salting out of nitrogen solutions can be found in Chapters 17 and 18 of the "Liquid Fertilizer Manual", National Fertilizer Solution Association, Peoria, Ill., said chapters being incorporated herein in reference.

CROSS REFERENCE TO RELATED APPLICATION

The subject application is related to my application Ser. No. 15,575, filed Feb. 26, 1979 and titled "Suspension or Dispersion-Type Fertilizers". The entire disclosure of said application is hereby incorporated herein by reference.

In particular, the liquid fertilizer of the present invention can be blended in all proportions with the dispersion-type fertilizer in said application in order to produce dispersion-type fertilizers of higher nitrogen content than those in the application. The dispersion fertilizer of said application can also be blended with solutions of ammonium thiosulfate and UN 32-type solutions. However, the dispersion cannot be blended with aqueous ammonia, anhydrous ammonia or ammonium polysulfide.

SUMMARY OF THE INVENTION

A liquid fertilizer containing nitrogen and sulfur can be prepared by a process comprising (a) mixing sulfuric acid in water, (b) dissolving urea into the resulting solution, and (c) adding anhydrous ammonia in an amount sufficient to bring the pH of the solution to between about 6 and 8. The resulting liquid fertilizers can contain in the range of about 19 to about 25% nitrogen and in the range of about 3 to 6% sulfur and remain substantially free from crystals when stored at temperatures above about 40° F. A 19-0-0 liquid fertilizer containing about 3% S (as sulfate) remained crystal free when stored for about a month at about 32° F.

If crystals form in the liquid fertilizers, the crystals can frequently be redissolved by stirring, or by heating or both or by adding additional water. In many instances the stirring can cause the crystals to break up into very fine, sand-like particles which are not objectionable and which will not reagglomerate into larger masses.

In the invention, for every pound of anhydrous ammonia used there is prefeably at least about 3 pounds of sulfuric acid, (typically 3-4 pounds of 90-98% sulfuric acid). Preferably the amount of water in which the sulfuric acid is mixed is such that there is a temperature increase of about 20° F. during the dissolving process.

Similarly, it is also preferred that the amount of urea which is dissolved into the resulting sulfuric acid solution be sufficient to cause the solution temperature to decrease by at least about 40° F. (typically about 50° F.). The amount of ammonia used is generally very small, for example, in a 19-0-0-3% S liquid fertilizer, the amount of ammonia used to attain a pH of about 7 was about 100 pounds per ton of product.

FURTHER DESCRIPTION OF THE INVENTION

The present process is preferably practiced utilizing a turbine impellar and a centrifugal pump impeller, as for example the Vac-U-Mac T-1200 mixer (BARD & BARD Co., Joplin, Miss.).

The process of the present invention can also be practiced in a T or pipe-type reactor; however, this is generally a more expensive processing system than the combination of a centrifugal pump and turbine impellors. However, when making these solutions in a T reactor, the urea could be made in situ, by mixing carbon dioxide and ammonia.

Using the process of the present invention, fertilizers analyzing in the range from 19 to as high as 28% nitrogen and in the range of about 3-6% sulfur (as sulfate) can be made. However, for optimum storage the preferred compositions contain in the range of about 19 to about 25% N.

Small amounts of salts of calcium, magnesium, iron, copper, manganese, zinc boron, cobalt, molybdenum and of the micronutrients can be added to the liquids by using chelating agents and/or polyphosphates as "solubilizers".

ILLUSTRATIVE EXAMPLES

Example 1

A 28-0-0-5S liquid fertilizer was made by adding 315 pounds of 98% sulfuric acid to 125 pounds of water. The temperature rose to about 180° F. during the dissolving period. 1440 pounds of a UN-32 solution was added to the sulfuric acid solution. The temperature dropped to about 120° F. during the dissolving period. 120 pounds of anhydrous ammonia was then added to adjust the pH to about 7. The resulting liquid fertilizer was slightly opaque and yellowish in cast. Some crystals formed when it was stored below 32° F.

The UN 32 solution which was used in this example was prepared by adding 511 pounds of urea to 261 pounds of hot (170° F.) water then adding 665 pounds of ammonium nitrate in a Bard & Bard T-1200 mixer and mixing until a solution was obtained. The pH was then adjusted to 7 by adding ammonia (about 3 pounds) to make the 1440 pounds of UN-32.

Example 2

A 30-0-0-5S formulation was attempted by adding 1565 pounds of UN-32 (prepared as in (Example 1) to 315 pounds of 94% sulfuric acid, and then adding 120 pounds of anhydrous ammonia. Extreme heat was generated in the mixer and the product was solid upon cooling.

Example 3

A 19-0-0-3% S liquid fertilizer was made by adding 190 pounds of 99% sulfuric acid to 1021 pounds of water. To the resulting solution was added 739 pounds of urea. When the urea was completely dissolved, 50 pounds of anhydrous ammonia was added to adjust the pH to about 7. The resulting liquid fertilizer had a slight odor of ammonia, a yellow cast and was slightly opaque. It produced few if any crystals when stored for a month at 32° F. A fine powder formed at the bottom of the vessel when stored at about 70° F. and the resulting supernatant liquid was clear. The anhydrous ammonia can be added before the urea completely dissolves, such as when the temperature decrease, caused by urea dissolution, has substantially ceased.

Example 4

A 21-0-0-1.3S liquid fertilizer was made by adding 80 pounds of 99% sulfuric acid to 1040 pounds of water. 830 pounds of urea was fully dissolved in the resulting solution. The pH was adjusted to about 9.5 by adding 50 pounds of ammonia. The resulting liquid fertilizer evolved large amounts of ammonia gas. Probably due to the high pH. This example illustrates a formulation containing too small a proportion of sulfuric acid and too high a neutralization pH.

Example 5

A 25-0-0-5 non-pressure nitrogen-sulfur solution was made by adding 320 pounds of 94.5% sulfuric acid to 671 pounds of water (at 50° F.) then dissolving 909 pounds with urea and, when the solution temperature reached about 20° F., adding 100 pounds of anhydrous ammonia.

Example 6

A variation of the present process can be used to make dispersion-type fertilizers as illustrated by this example of a 20-0-0-5.

312 pounds of 99% sulfuric acid were added to 816 pounds of water. 783 pounds of urea were added to the resulting solution and, once fully dissolved 49 pounds of ammonia and 40 pounds of clay were added (clay was added to the water before the acid). The resulting dispersion-type fertilizer was too acidic for most uses, except for soil conditioning, due to an acidic pH (which can be remedied by adding additional ammonia). The product also turned stainless-steel to a black color with bubbling. Upon cooling additional ammonia can be added to neutralize the product. Other nutrients e.g. potassium chloride, potassium sulfate, and trace elements can be added.

Example 7

Dispersion-type fertilizers of low phosphate content can be made by subtituting phosphoric acid for some or all of the sulfuric acid in the previous examples. For example a 20-5-0 dispersion-type fertilizer can be made by such substitution of phosphoric acid for sulfuric acid in Example 6. The resulting product was a good dispersion-type fertilizer and is especially useful when in the range of 10–40 wt % sulfur is blended into the dispersion fertilizer. All of the dispersion or liquid type fertilizers described herein and in the application incorporated herein are especially useful when blended with elemental sulfur.

Example 8

A 9-30-0 suspension fertilizer was prepared using the following procedure: the desired quantity of water was charged to a mixing vessel and Floridin Minugel ™ 200 clay was then dispersed in the water. Phosphoric acid (0-52-0) was added with thorough mixing, and the diammonium phosphate (18-46-0) added. Anhydrous ammonia was introduced to the suspension, and the fertilizer product was removed from the mixer.

Four batches were prepared by this procedure and the resulting products combined. Weights used are given in the following table:

| Batch Number | Pounds Added | | | | |
|---|---|---|---|---|---|
| | Water | Clay | 0-52-0 | 18-46-0 | Ammonia |
| 1 | 4020 | 240 | 3020 | 3840 | 380 |
| 2 | 4060 | 180 | 3020 | 4380 | 400 |
| 3 | 4020 | 180 | 3060 | 4390 | 350 |
| 4 | 4030 | 180 | 3050 | 4380 | 360 |
| Total | 16130 | 780 | 12150 | 16990 | 1490 |

A sample of the product was analyzed and found to contain 9.6% nitrogen and 29.0% $P_2O_5$. The final pH after dilution 1:9 with water was 6.8, indicating a slight over-ammoniation, which can be easily corrected by mixing plant operator. The flow characteristics and storage properties of this suspension fertilizer have been found to be satisfactory.

Example 9

11.02 tons of the dispersion type 9-30-0 fertilizer of Example 8 were blended with 13.24 tons of a 19-0-0-3 non-pressure liquid mode as in Example 3.

The resulting blend was a high quality dispersion type fertilizer.

The non-pressure liquids described herein can be blended in all proportions with the dispersion fertilizers of said application filed Feb. 26, 1979.

What is claimed is:

1. A process for preparing a non-pressure liquid fertilizer containing nitrogen and sulfur comprising
   (a) mixing sulfuric acid in water,
   (b) dissolving urea into the resulting solution, and
   (c) adding anhydrous ammonia in an amount sufficient to bring the pH of the solution to between about 6 and 8.

2. The process of claim 1 wherein the resulting liquid fertilizer product contains in the range of about 18 to about 26% nitrogen and in the range of about 2 to 6% sulfur and remains substantially free from crystals when stored at temperatures above about 40° F.

3. The process of claim 2 wherein the liquid fertilizer product of said process contains about 19% nitrogen and about 3% sulfur and remains substantially free of crystals when stored for about one month at about 32° F.

4. The process of claim 1 wherein the liquid fertilizer product of said process is blended with a dispersion type fertilizer.

5. The process according to claim 4 wherein said dispersion-type fertilizer was made by the process comprising the steps of
   (d) mixing a dispersing agent, phosphoric acid and an ammonium phosphate in water, and
   (e) introducing ammonia into the resulting mixture.

6. The blended dispersion type fertilizer product made by the process of claim 5.

7. The process of claim 5 wherein a non-pressure liquid fertilizer containing about 19% nitrogen and about 3% sulfur is blended with a dispersion type fertilizer containing about 9% nitrogen and about 30% $P_2O_5$.

8. A process for preparing a non-pressure liquid fertilizer containing nitrogen and sulfur comprising
   (a) mixing 90 to 98% sulfuric acid in water and allowing the resulting solution to increase in temperature due to heat of solution;
   (b) dissolving urea into the resulting solution while it is still at an elevated temperature, and
   (c) adding anhydrous ammonia in an amount sufficient to bring the pH of the solution to between about 6 and 8.

9. The process of claim 8 wherein the amount of water in which the sulfuric acid is mixed is such that said increase in temperature is at least about 20° F.

10. The process of claim 9 wherein the amount of urea which is dissolved into the resulting sulfuric acid is sufficient to cause said solution temperature to decrease by at least about 40° F.

11. The process of claim 8 wherein for every pound of said ammonia added, said solution contains at least about three pounds of sulfuric acid.

12. The process of claim 1 wherein for every pound of said ammonia added, about three to four pounds of 90 to 98% sulfuric acid is dissolved into said water in step (a).

13. A process for preparing a non-pressure liquid fertilizer containing in the range of 19 to 28% nitrogen, as urea compounds and ammonium compounds, and 2 to 6% sulfur, as sulfite compounds, comprising
   (a) mixing 90 to 98% sulfuric acid in sufficient water to produce a solution having at least a 20° F. increase in temperature due to heat of solution;
   (b) dissolving urea into said resulting solution of step (a) while said solution is at an elevated temperature, said urea being in an amount sufficient to cause the solution temperature to decrease by at least about 40° F.; and
   (c) adding anhydrous ammonia in an amount sufficient to bring the pH of the resulting solution to between about 6 and 8, said amount of ammonia being such that less than one pound of ammonia is added for every three pounds of said sulfuric acid mixed in step (a).

14. The process of claim 13 wherein the resulting liquid fertilizer product contains in the range of about 18 to about 26% nitrogen and in the range of about 3 to 6% sulfur and remains substantially free from crystals when stored at temperatures above about 40° F.

15. The process of claim 13 wherein the liquid fertilizer product of said process contains about 19% nitrogen and about 3% sulfur and remains substantially free of crystals when stored for about one month at about 32° F.

16. The process of claim 13 wherein the liquid fertilizer product of said process is blended with a dispersion type fertilizer.

17. The process according to claim 16 wherein said dispersion-type fertilizer was made by the process comprising the steps of (d) mixing a dispersing agent, phosphoric acid and an ammonium phosphate in water, and (e) introducing ammonia into the resulting mixture.

18. The blended dispersion type fertilizer product made by the process of claim 17.

19. The process of claim 17 wherein a non-pressure liquid fertilizer containing about 19% nitrogen and about 3% sulfur is blended with a dispersion type fertilizer containing about 9% nitrogen and about 30% $P_2O_5$.

* * * * *